United States Patent [19] [11] 4,371,911
Baker [45] Feb. 1, 1983

[54] EXCESS VOLTAGE ARRESTERS

[75] Inventor: Basil O. Baker, Hertfordshire, England

[73] Assignee: The M-O Valve Company Limited, London, England

[21] Appl. No.: 261,946

[22] Filed: May 8, 1981

[30] Foreign Application Priority Data

May 16, 1980 [GB] United Kingdom ................ 8016345

[51] Int. Cl.³ ................................................ H02H 7/24
[52] U.S. Cl. ..................................... 361/124; 361/129
[58] Field of Search ................. 361/54, 131, 124, 125, 361/129, 103; 200/61, 19; 337/15, 17, 18, 31, 32, 34, 414, 415, 416, 407; 340/590, 593

[56] References Cited

U.S. PATENT DOCUMENTS

| | | | |
|---|---|---|---|
| 4,034,326 | 7/1977 | Hill et al. | 337/407 X |
| 4,056,840 | 11/1977 | Lundsgaard et al. | 361/124 |
| 4,191,987 | 3/1980 | Coren | 337/18 X |
| 4,212,047 | 7/1980 | Napiorkowski | 361/124 |

*Primary Examiner*—Harry E. Moose, Jr.
*Attorney, Agent, or Firm*—Kirschstein, Kirschstein, Ottinger & Cobrin

[57] ABSTRACT

An excess voltage arrester (1 to 21) provided with an overheating protection device comprising a resilient electrically conductive first member (23) in a flexed condition and a second member (25) of heat softenable electrically insulating material associated with the first member such that on over-heating of the arrester the second member softens allowing the first member to move in an attempt to return to its natural shape, and thereby establish an electrically conductive path through itself between the arrester electrodes.

6 Claims, 4 Drawing Figures

EXCESS VOLTAGE ARRESTERS

This invention relates to excess voltage arresters.

The invention relates particularly to excess voltage arresters of the kind, hereinafter referred to as the kind specified, comprising a gas-filled enclosure and a pair of electrodes housed within the enclosure which define between them a discharge gap.

In use an arrester of the kind specified is connected across an equipment it is desired to protect against excess voltage, the discharge gap breaking down on the occurrence of excess voltage. In the event that a discharge should occur in the arrester over a prolonged period such that the arrester overheats, it is important that the arrester should fail in a safe manner and so as not to leave the equipment unprotected.

It is an object of the present invention to provide an excess voltage arrester of the kind specified which on overheating fails in such a manner.

According to the present invention an excess voltage arrester of the kind specified is provided with an overheating protection device comprising a resilient electrically conductive first member in a flexed condition and a second member of heat softenable electrically insulating material associated with said first member so that on overheating of the arrester the second member softens allowing the first member to move in an attempt to return to its natural shape, and thereby establish an electrically conductive path through itself between the arrester electrodes.

Preferably the first and second members are mounted externally of the arrester enclosure.

In a preferred arrangement in accordance with the invention a portion of the second member is trapped between the first member and a rigid member electrically connected to an electrode of the arrester, so that on softening of the second member the first member forces its way through said part of the second member into electrical contact with said rigid member.

In one particular such preferred arrangement in accordance with the invention said first member is in the form of a length of wire and the second member is in the form of a sleeve on the wire. In one such arrangement the natural shape of the wire is essentially straight and the wire in its sleeve is held flexed between rigid leads to the arrester electrodes.

In a second particular such preferred arrangement in accordance with the invention the first member comprises a spring in compression, and the second member comprises a hollow cylindrical housing for the first member disposed between rigid leads to the arrester electrodes.

Two excess voltage arresters in accordance with the invention will now be described, by way of example, with reference to the accompanying drawings in which.

Figure 1:
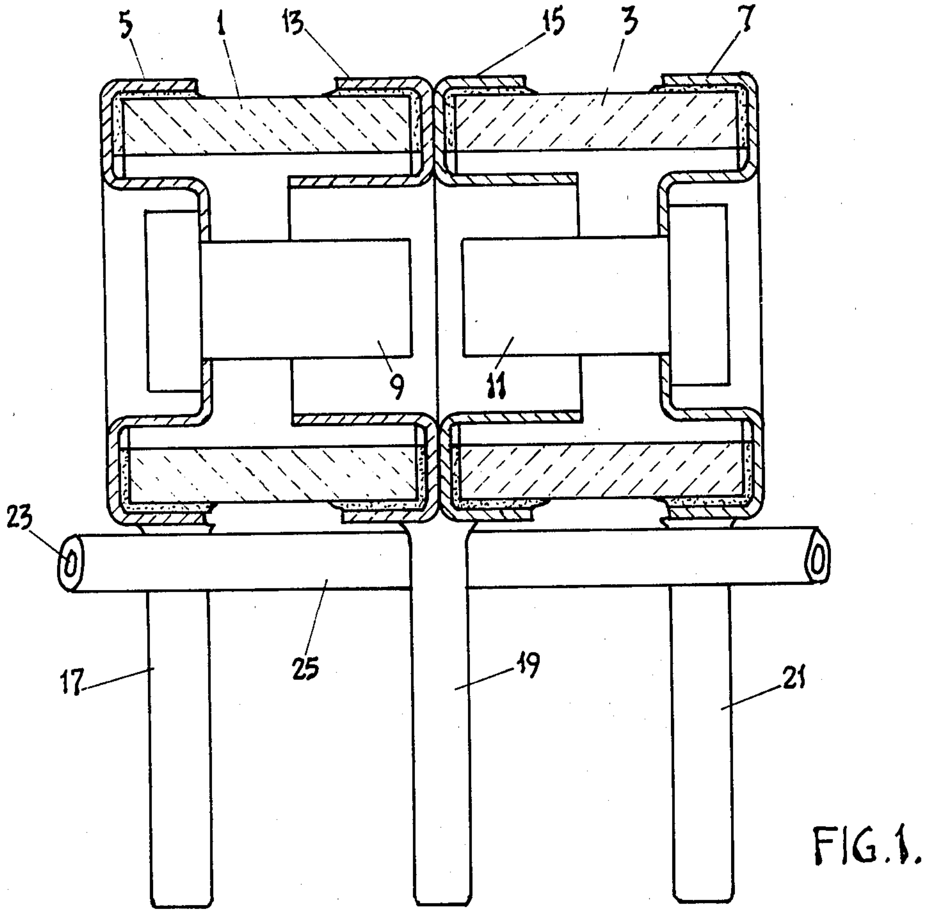
FIG. 1 is a sectional side view of the first arrester.
Figure 2:
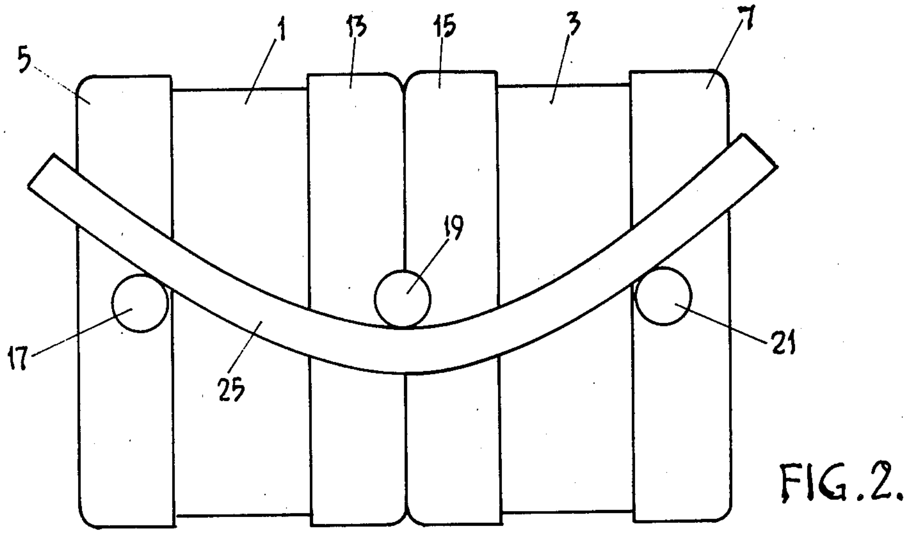
FIG. 2 is a plan view of the arrester of FIG. 1.

Referring to FIGS. 1 and 2, the first arrester comprises a hermetically sealed, hollow, cylindrical, gas-filled enclosure comprising two identical tubular ceramic members 1 and 3 sealed end-to-end, and two metal end caps 5 and 7.

The enclosure houses two cylindrical metal electrodes 9 and 11 respectively sealed through apertures formed centrally in the two end caps 5 and 7, the inner ends of the electrodes 9 and 11 defining between them a discharge gap positioned centrally within the enclosure. The discharge gap and adjacent parts of the electrodes 9 and 11 are coaxially surrounded by a third tubular electrode constituted by internal flanges formed on two metal rings 13 and 15 sealed between the ceramic members 1 and 3.

The three electrodes 9, 13 and 15, and 11 are provided with respective rigid, parallel, external wire leads 17, 19 and 21, extending radially of the enclosure, in the same direction, and secured at their inner ends by welding.

A length of stiff, normally straight, resilient metal wire 23, such as piano wire, provided with a sleeve 25 of heat softenable plastics material, such as polyvinyl chloride, is threaded through the gaps between the rigid leads 17, 19 and 21 so as to lie on one side of the central lead 19 and on the opposite side of the other two leads 17 and 21. The wire 23 is thus in a bowed, flexed condition. The wire 23 and sleeve 25 are disposed as near as possible to the external surface of the arrester enclosure so as to be in good normal contact therewith. Normally (although not shown) the arrester and the sleeved wire are encapsulated in a suitable electrically insulating material, the leads 17, 19 and 21 being provided with flexible wire extensions (not shown), if necessary.

In use of the arrester the electrodes 9 and 11 are typically respectively connected via their leads to a pair of lines connected with an equipment which it is desired to protect against excess voltage and the electrode 13, 15 is grounded. On the occurrence of a voltage between the electrodes 9 and 11, or between either of the electrodes 9 and 11 and ground, in excess of the arrester strike voltage, a discharge occurs in the enclosure, thereby protecting the equipment from excess voltage. The desired strike voltage is obtained by appropriate choice of the pressure and composition of the gas-filling and the geometry of the electrode structure.

If the discharge is maintained for a prolonged period e.g. 4 to 5 seconds, the heat generated by the discharge causes the material of the sleeve 25 to soften allowing the wire 23 to force its way through the sleeve 25 into good electrical contact with each of the leads 17, 19 and 21. The arrester electrodes are thus shorted together causing the discharge in the enclosure to terminate and so prevent the further generation of heat in the arrester and the possibility of dangerously high temperatures being reached such as may cause the encapsulation, if present, to ignite. In addition leads 17 and 21 are permanently grounded securing protection of the equipment against excess voltage.

If desired, in order to secure the wire 23 and sleeve 25 in position, the sleeve 25 may be broken along its length and the wire 23 bonded to one of the leads 17, 19 and 21 by welding or soldering.

Figure 3:
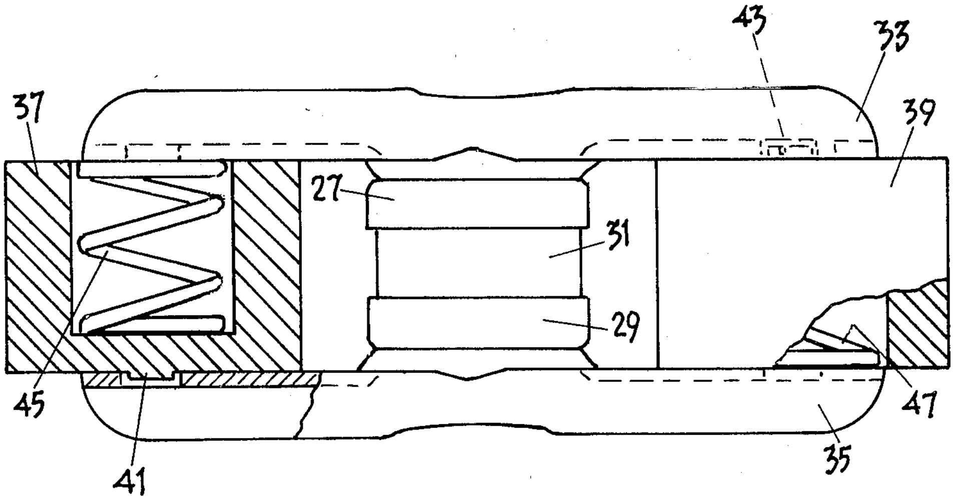
FIG. 3 is a part-sectional side view of the second arrester.
Figure 4:
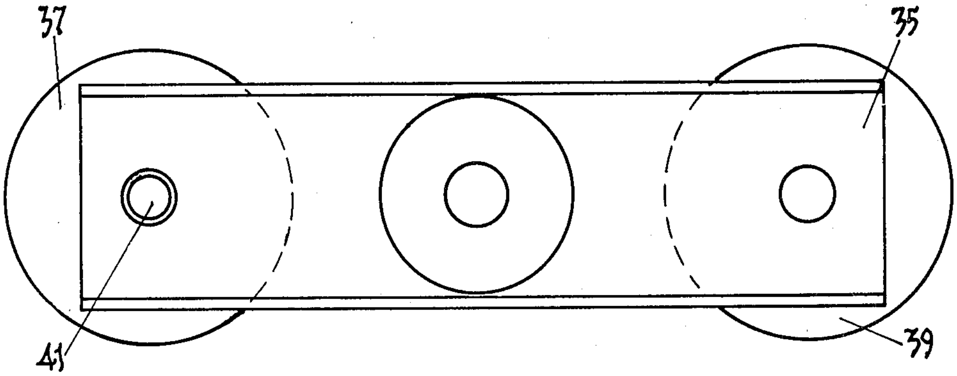
FIG. 4 is a plan view of the arrester of FIG. 3.

Referring now to FIGS. 3 and 4, the second arrester body is of similar form to the arrester body of FIGS. 1 and 2, but with the central electrode omitted. Thus the arrester body comprises two electrodes (not shown) housed in an enclosure comprising two end caps 27 and 29 sealed to opposite ends of one and the same tubular ceramic member 31.

The arrester body is mounted between two parallel rectangular metal plates 33 and 35 each provided with upturned flanges along its longer edges. The two plates 33 and 35 are respectively electrically connected to the end caps 27 and 29 and thus provide terminals for external connection of the arrester.

On either side of the arrester body, between the plates 33 and 35, there is a cup-shaped member 37 or 39 of heat softenable plastics material, each of the cups 37 and 39 having a pimple 41 or 43 formed centrally on the external surface of its base which locates in an aperture in the adjacent plate.

Within each of the cups 37 and 39 there is housed a helical metal spring 45 or 47 held in compression between the base of the associated cup 37 or 39 and the plate 33 or 35 adjacent the open end of the cup.

On overheating, the material of the cups 37 and 39 softens allowing the springs 45 and 47 to force their way through the bases of the cups and electrically connect the two plates 33 and 35.

The form of arrester shown in FIGS. 3 and 4 finds particular application for excess voltage protection of telephone exchange equipment, the arrester being adapted for slidable mounting between a pair of spaced parallel terminals provided for this purpose in the telephone exchange equipment racks.

I claim:

1. An excess voltage arrester comprising: a gas-filled enclosure; a pair of electrodes housed within the enclosure which define between them a discharge gap; respective rigid leads to said electrodes; and an overheating protection device comprising a resilient electrically conductive first member in a flexed condition and a second member of heat softenable electrically insulating material associated with said first member so that on overheating of the arrester the second member softens allowing the first member to move in an attempt to return to its natural shape, and thereby establish an electrically conductive path through itself between the arrester electrodes, said first member being in the form of a length of wire whose natural shape is essentially straight and said second member being in the form of a sleeve on the wire, and said wire in its sleeve being held flexed between said rigid leads to the arrester electrodes so that a portion of said sleeve is trapped between said wire and a said lead, and so that on softening of the said sleeve said wire forces its way through said part of the sleeve into electrical contact with said lead.

2. An arrester according to claim 1 wherein the arrester has at least three electrodes provided with respective rigid leads extending in parallel spaced relation, and said wire in its sleeve is threaded through the gaps between said leads.

3. An excess voltage arrester comprising: a gas-filled enclosure; a pair of electrodes housed within the enclosure which define between them a discharge gap; respective rigid leads to said electrodes; and an overheating protection device comprising a resilient electrically conductive first member in a flexed condition and a second member of heat softenable electrically insulating material associated with said first member so that on overheating of the arrester the second member softens allowing the first member to move in an attempt to return to its normal shape, and thereby establish an electrically conductive path through itself between the arrester electrodes, said first member comprising a spring in compression and said second member comprising a hollow cylindrical housing for said spring disposed between said rigid leads to the arrester electrodes so that a portion of said housing is trapped between said lead, and on softening of said housing said spring forces its way through said part of the housing into electrical contact with said lead.

4. An arrester according to claim 3 wherein said rigid leads are in the form of a pair of parallel spaced plates and the arrester enclosure is mounted between the plates.

5. An arrester according to claim 1 or claim 3 wherein said first member is permanently electrically connected with an electrode of the arrester.

6. An arrester according to claim 1 or claim 3 wherein, prior to softening of the second member on overheating of the arrester, the first member is insulated from both said electrodes.

* * * * *